(12) United States Patent
Callender et al.

(10) Patent No.: US 10,893,428 B2
(45) Date of Patent: Jan. 12, 2021

(54) METHODS FOR ADAPTING UE MEASUREMENT PERIOD TO CONDITIONS

(71) Applicant: TELEFONAKTIEBOLAGET L M ERICSSON (PUBL), Stockholm (SE)

(72) Inventors: Christopher Callender, Kinross (GB); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 78 days.

(21) Appl. No.: 16/068,675

(22) PCT Filed: Dec. 28, 2016

(86) PCT No.: PCT/IB2016/058028
§ 371 (c)(1),
(2) Date: Jul. 8, 2018

(87) PCT Pub. No.: WO2017/118898
PCT Pub. Date: Jul. 13, 2017

(65) Prior Publication Data
US 2019/0053087 A1 Feb. 14, 2019

Related U.S. Application Data

(60) Provisional application No. 62/276,273, filed on Jan. 8, 2016.

(51) Int. Cl.
*H04W 24/10* (2009.01)
*H04W 36/00* (2009.01)
(Continued)

(52) U.S. Cl.
CPC .......... *H04W 24/10* (2013.01); *H04B 17/309* (2015.01); *H04L 1/0017* (2013.01);
(Continued)

(58) Field of Classification Search
CPC .................................................... H04W 24/10
See application file for complete search history.

(56) References Cited

U.S. PATENT DOCUMENTS

2005/0059421 A1\* 3/2005 Reed ............... H04L 1/0002
455/522
2009/0059871 A1\* 3/2009 Nader ............ H04W 36/00837
370/337
(Continued)

FOREIGN PATENT DOCUMENTS

EP   2 547 012 A1 \* 1/2013 ............. H04B 17/00
EP   2627121 A1   8/2013

OTHER PUBLICATIONS

European Office Action dated Oct. 21, 2019 for European Patent Application No. EP 16829127.6, 11 pages.
(Continued)

*Primary Examiner* — Jeffrey M Rutkowski
*Assistant Examiner* — Chae S Lee
(74) *Attorney, Agent, or Firm* — Sage Patent Group

(57) ABSTRACT

Embodiments described herein are directed to methods for adaptively configuring a measurement period in a user equipment or another network node. The measurement period can be determined based at least in part on an assessment of one or more conditions, wherein each of the measurement periods is associated with at least one condition. The determined measurement period can be used for performing and/or reporting one or more measurements. According to certain embodiments, the measurement period may be adapted by maintaining concurrently two or more measurement filters with different measurement periods and then selecting the appropriate one, based on a condition assessment result.

28 Claims, 9 Drawing Sheets

(51) Int. Cl.
*H04B 17/309* (2015.01)
*H04L 1/00* (2006.01)
*H04L 5/00* (2006.01)
*H04W 72/12* (2009.01)

(52) U.S. Cl.
CPC .......... *H04L 1/0026* (2013.01); *H04L 5/0048* (2013.01); *H04W 36/0094* (2013.01); *H04W 72/1231* (2013.01)

(56) References Cited

U.S. PATENT DOCUMENTS

| | | |
|---|---|---|
| 2014/0003257 A1 | 1/2014 | Chin et al. |
| 2014/0092761 A1* | 4/2014 | Behravan ............. H04W 24/02 370/252 |
| 2014/0248840 A1* | 9/2014 | Karri .................... H04W 48/16 455/67.11 |
| 2015/0119039 A1* | 4/2015 | Virtej ................... H04W 24/10 455/436 |
| 2015/0195730 A1 | 7/2015 | Siomina et al. |

OTHER PUBLICATIONS

First Examination Report dated Jun. 19, 2020 for Indian Patent Application No. 201817026518, 7 pages.

\* cited by examiner

METHODS FOR ADAPTING UE MEASUREMENT PERIOD TO CONDITIONS

FIELD

Embodiments of the invention relate to the field of wireless communication; and more specifically, to methods, apparatus and systems for adapting User Equipment (UE) measurement periods to various conditions.

BACKGROUND

In 3GPP specifications for both Wideband Code Division Multiple Access (WCDMA) and Long Term Evolution (LTE) systems, a so called measurement period is defined for UE physical layer measurements of serving and neighbor cells. This is a time duration over which the UE is expected to filter measurement samples, and over which the accuracy requirements specified by 3GPP RAN WG4 apply. For example, in non-discontinuous reception (DRX) operation in LTE, the intra-frequency measurement period has been specified as 200 ms. This means that the UE should filter a number of samples (exact filter implementation and number of samples up to UE implementation) over the measurement period such that the filtered result is sufficiently accurate, considering the RAN4 requirements for accuracy. All standard-compliant UEs have to also pass tests specified by the 3GPP standard ensuring that the UE is capable of reporting within the specified measurement period and also that the UE-reported measurements meet the specified accuracy requirements in the specified conditions.

A typical physical layer measurement implementation for intra-frequency measurements in non DRX is described as follows. The UE makes measurements every 40 ms, and maintains a running linear average using a 5 sample window. Every 40 ms the running average is updated and the measurement result is passed to higher layers for possible additional filtering (using a standardized L3 filter), measurement event evaluation and so on.

Mathematically, this can be described as follows:
Define M(t) to be the linear physical layer measurement sample at index t. M(t) can for example correspond to a physical layer sample of a UE measurement such as reference signal received power (RSRP), reference signal received quality (RSRQ) or channel state information (CSI)-RSRP, t=0 corresponds to time 0 ms, t=1 corresponds to 40 ms and so on;

$$F(t)=0.2*[M(t)+M(t-1)+M(t-2)+M(t-3)+M(t-4)]; \quad \text{Eq. (1)}$$

F(t) is the measurement sample passed to the higher layers for further processing and evaluation.

In this example, the filtering operation is linear averaging, but other filtering methods of the samples are allowed by specifications provided that the accuracy requirements are met. Similarly, the 40 ms periodicity (which implies that there are 5 samples in the measurement period) is an example, and other measurement sample rates and corresponding number of samples in the measurement period are allowed to be used.

One important point to note is that a running filter, which generates a new sample more frequently than the 200 ms measurement period is implied by the specifications. If the UE performed block processing of the measurement samples (e.g. every 200 ms rather than every 40 ms) then it would not meet RAN4 requirements for event reporting delay.

The reason for specifying measurement period and corresponding accuracy requirements is to ensure consistent measurement results between different UE implementations, so that measurement results may be readily used in network Radio Resource Management (RRM) procedures such as handover etc. Both absolute and relative accuracy of measurements is specified, and the measurement period ensures that the physical layer of different implementations performs similarly as far as mitigating the effects of fading channel conditions and ensuring that the reported measurement represents a somewhat long term estimate of the condition at the UE antenna connector.

Measurements with LAA

LAA, (a.k.a. license assisted access) or operation based on frame structure type 3 (the frame structure type 3 is specified in 3GPP TS 36.211), which is introduced in LTE Rel-13, refers to the UE operation on at least one carrier in non-licensed spectrum such as Band 46 also used for WiFi access, e.g., a UE can be configured with carrier aggregation with PCell in Band 1 (licensed spectrum) and SCell in Band 46 (unlicensed spectrum). An eNB operating in the unlicensed band only transmits signals which may be used for UE measurements using so called discovery reference symbols (DRS). Unlike release 8 CRS (common reference symbols), DRS is not transmitted in every subframe, and is instead transmitted periodically (eg every 160 ms). Moreover, the eNB may perform so called listen before talk (LBT) procedures to check that no other unlicensed node (such as a wifi access point) is transmitting before it transmits DRS. This means that from a UE perspective, the eNB may be unable to transmit any particular DRS transmission. In certain regions, LBT functionality is required from a regulatory point of view to ensure fair coexistence of different radios and access technologies on the unlicensed band.

In LAA, different measurement periods have been specified depending on CRS Ês/Iot (see R4-158388) eg:
M is the number of configured discovery signal occasions which are not available during $T_{measure\_intra\_FS3\_CRS}$ for the measurements at the UE due to the absence of the necessary radio signals.

TABLE 8.x.2.1.1.1-2

Intra-frequency measurement requirements under operation with frame structure 3

| Measurement bandwidth [RB] | CRS Ês/Iot | Discovery signal occasion duration (ds-OccasionDuration) [ms] | $T_{measure\_intra\_FS3\_CRS}$ [ms] |
|---|---|---|---|
| ≥6 | [0] ≤ CRS Ês/Iot | 1 | ([3] + M) * $T_{DMTC\_periodicity}$ |
| ≥6 | [−6] ≤ CRS Ês/Iot < [0] | 1 | ([5] + M) * $T_{DMTC\_periodicity}$ |
| ≥25 | [0] ≤ CRS Ês/Iot | 1 | ([1] + M) * $T_{DMTC\_periodicity}$ |
| ≥25 | [−6] ≤ CRS Ês/Iot < [0] | 1 | ([3] + M) * $T_{DMTC\_periodicity}$ |

The RSRP measurement accuracy (for non-carrier aggregation (CA)) for all measured cells shall be as specified in Section 9.1.18, and the RSRQ measurement accuracy (for CA) for all measured cells shall be as specified in Section 9.1.19.

Focusing on the last two lines of the table with Measurement bandwidth ≥25RB, it is seen that there are different measurement periods depending on CRS Ês/Iot (or SINR on CRS resource elements). For example, if [0]≤CRS Ês/Iot then the measurement periods is ([1]+M)*$T_{DMTC\_Periodicity}$ (corresponding to so called single-shot measurements) whereas at lower Ês/Iot the UE is expected to report measurements based on $([3]+M)*T_{DMTC\_Periodicity}$ (corresponding to so called multishot or three shot measurements).

By using a fixed measurement period in a prior-art UE, measurements are specified to give a sufficient accuracy in noisy (e.g., AWGN noise) channel conditions as well as mitigating the short term effects of channel fading. However, the filtering which is introduced also introduces delay to the UE measurement reports. For example, if there is a step change in measurement conditions at the UE antenna connector (which could physically correspond to turning a corner and getting line of sight (LOS) propagation to the target cell for instance), there will be a delay before the filtered (e.g. average) measurement result changes sufficiently to trigger an event. The example given above is for non-DRX operation (200 ms intra-frequency measurement period), but the delays become even more significant in DRX operation. In Release 8 specifications the DRX measurement period is 5 DRX cycles which corresponds to 10.24 s with a 2.56 s DRX cycle.

In new releases of the specification, some new study/work items are considered where the filtering delay will become even more problematic which also makes using the fixed measurement period less desirable, for example:

LAA:

Considering the opportunities for the UE to make measurements of target cells, it can be observed that compared to 3GPP Release 8 the opportunities are less frequent, both because of the less frequent transmission of DRS compared to release 8 CRS and the possibility that any transmission of the DRS may be blocked if the listen before talk procedure determines that the channel is busy and hence the target eNB for measurements is unable to transmit.

Extended DRX:

In 3GPP Release 13, for example, an extended DRX cycle up to 10.24 s is specified. Considering the previous approach (used since release 8) to specify a measurement period of 5 DRX cycles, this would result in a measurement period of 51.2 seconds. Clearly, for a mobile device, measurement results may change very significantly over a 51.2 s period and this delay in measurement event reporting may result in failed RRM procedures, radio link failure, dropped connections etc.

High Speed Train Operation:

In 3GPP Release 13 a study item was started to investigate UE performance at speeds up to, and beyond, 350 km/h. At high speed, using even the pre-release 13 DRX cycles (up to 2.56 s) is challenging as the UE moves a very significant distance during the measurement period.

Moreover, the LAA requirements specify different measurement periods depending on Ês/Iot, which can be statically configured in a test, but which is, however, not known to the legacy UE performing similar measurement in non-LAA system. Furthermore, CRS Ês/Iot or signal to (noise plus interference) ratio is a property of the received radio signal, which may vary dynamically and hence the UE cannot know a-priori which measurement period to use.

SUMMARY

As disclosed herein, methods, systems and apparatus are disclosed for adapting UE measurement periods to various conditions. According to an embodiment described herein, a method performed in a UE is disclosed. The method can include determining an adaptive measurement period to use for one or more measurements, based at least in part on an assessment of one or more conditions, wherein each of the measurement periods is associated with at least one condition. The method can further include using the determined measurement period for performing and/or reporting one or more measurements.

In one embodiment, adapting the measurement period may comprise maintaining concurrently two or more measurement filters with different measurement periods and then selecting the appropriate one, based on the condition assessment result. The measurement result based on the determined measurement period may then be reported to higher layers and/or another node.

At a higher Ês/Iot, fewer samples are necessary to be filtered to ensure that accuracy requirements are met. The UE determines when to apply which measurement period and when to report the measurement result to higher layers.

The determination can be based on: UE estimates and the UE decision to use the corresponding measurement period, and/or Network indication to use a certain measurement period (the network decision may be based on one or more of: the network prediction for the Ês/Iot, UE measurements, and UE location).

Furthermore, since the Ês/Iot is not known a-priori, the UE can maintain concurrently the physical layer measurement results filtered with at least two different measurement periods. The physical layer processing in the UE may then choose which of the measurement results to report to the higher layers depending on the estimated SINR over the same, or a different, time period.

In another embodiment, a method in a network node is disclosed. The method can include receiving information to be used for performing an assessment of one or more conditions at a UE. The method can further include determining an adaptive measurement period to use for one or more measurements, based on the assessment. Each of the measurement periods can be associated with at least one condition. The method can further include indicating to the UE the determined adaptive measurement period.

The embodiments described herein are not limited to LAA, but can also apply in a more general case when the UE may need to configure measurement period adaptively to one or more conditions, e.g., channel quality, Ês/Iot, SINR, received signal quality, total interference or interference on a specific resources or from a specific interferer(s), etc.

Various other features and advantages will become obvious to one of ordinary skill in the art in light of the following detailed description and drawings.

BRIEF DESCRIPTION OF THE DRAWINGS

The accompanying drawing figures incorporated in and forming a part of this specification illustrate several aspects of the disclosure, and together with the description serve to explain the principles of the disclosure.

DESCRIPTION OF EMBODIMENTS

Figure 1:
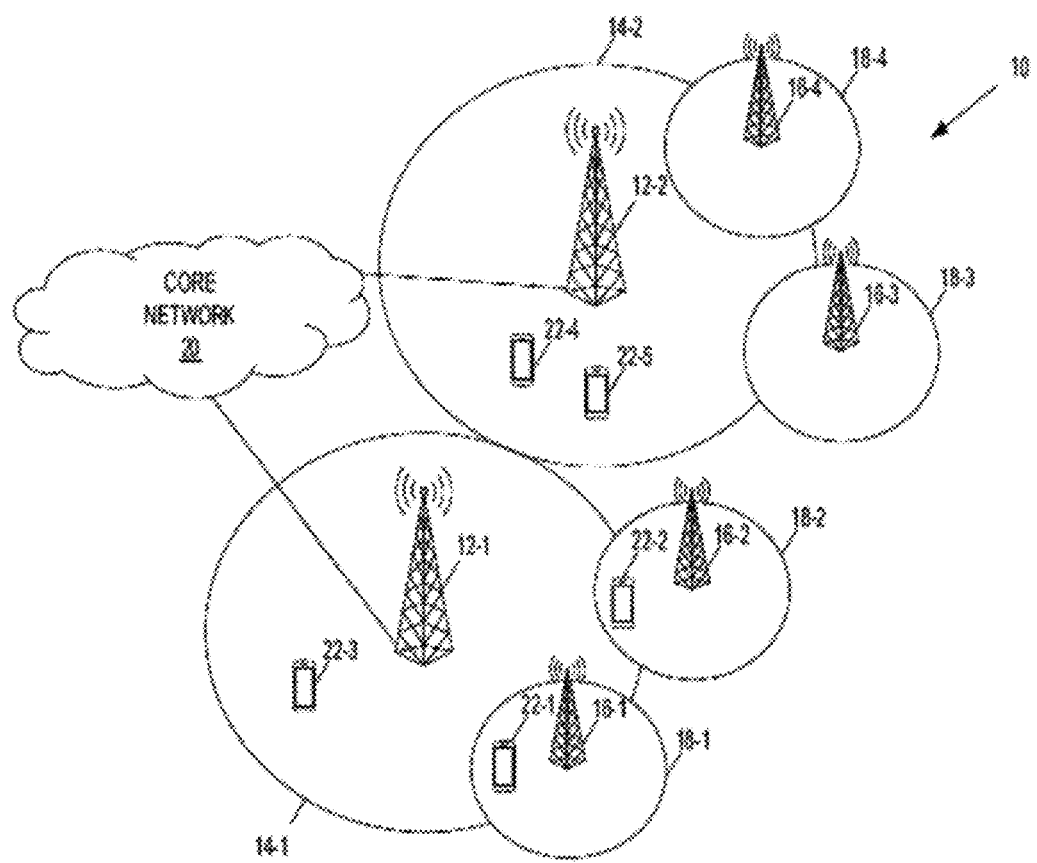
FIG. 1 illustrates one example of a cellular communications network according to some embodiments of the present disclosure.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

FIG. 1 illustrates one example of a cellular communications network 10 according to some embodiments of the present disclosure. In the embodiments described herein, the cellular communications network 10 is an LTE network in which some or all of the radio access nodes operate on a carrier(s) in an unlicensed spectrum, e.g., the 5 gigahertz (GHz) spectrum; however, the present disclosure is not limited thereto. For example, the cellular communications network 10 may implement LAA, LTE-U, MulteFire, or some other technology in which radio access nodes operate on an unlicensed carriers(s). In this example, the cellular communications network 10 includes base stations 12-1 and 12-2, which in LTE are referred to as eNBs, controlling corresponding macro cells 14-1 and 14-2. The base stations 12-1 and 12-2 are generally referred to herein collectively as base stations 12 and individually as base station 12. Likewise, the macro cells 14-1 and 14-2 are generally referred to herein collectively as macro cells 14 and individually as macro cell 14. The cellular communications network 10 also includes a number of low power nodes 16-1 through 16-4 controlling corresponding small cells 18-1 through 18-4. In LTE, the low power nodes 16-1 through 16-4 can be small base stations (such as pico or femto base stations) or Remote Radio Heads (RRHs), or the like. Notably, while not illustrated, one or more of the small cells 18-1 through 18-4 may alternatively be provided by the base stations 12. The low power nodes 16-1 through 16-4 are generally referred to herein collectively as low power nodes 16 and individually as low power node 16. Likewise, the small cells 18-1 through 18-4 are generally referred to herein collectively as small cells 18 and individually as small cell 18. The base stations 12 (and optionally the low power nodes 16) are connected to a core network 20.

The base stations 12 and the low power nodes 16 provide service to wireless devices 22-1 through 22-5 in the corresponding cells 14 and 18. The wireless devices 22-1 through 22-5 are generally referred to herein collectively as wireless devices 22 and individually as wireless device 22. In LTE, the wireless devices 22 are referred to as UEs.

In this example, the macro cells 14 are provided in either a licensed frequency spectrum (i.e., in the frequency spectrum dedicated for the cellular communications network 10), e.g., for LAA operation or an unlicensed frequency spectrum, e.g., for LAA in the unlicensed spectrum (LAA-U) or MulteFire operation. In this example, one or more (and possibly all) of the small cells 18 are provided in an unlicensed frequency spectrum (e.g., the 5 GHz frequency spectrum).

In this particular example, the base stations 12, 14 that operate on a carrier(s) in an unlicensed spectrum operate to perform LBT and transmit MBMS data according to any of the embodiments described herein.

Figure 2:
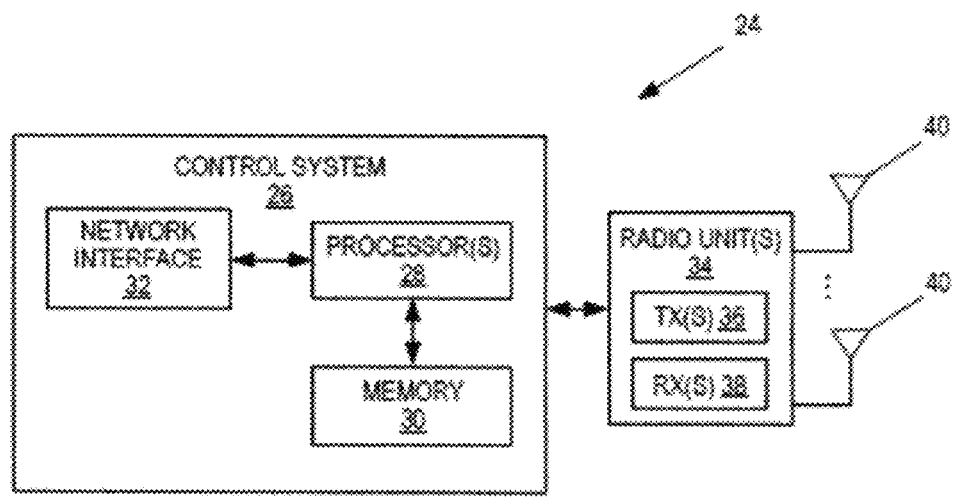
FIG. 2 is an exemplary block diagram of a radio access node, according to various exemplary embodiments.

FIG. 2 is a schematic block diagram of radio access node 24 according to some embodiments of the present disclosure. The radio access node 24 may be, for example, a base station 12, 16. As illustrated, the radio access node 24 includes a control system 26 that includes one or more processors 28 (e.g., Central Processing Units (CPUs), Application Specific Integrated Circuits (ASICs), Field Programmable Gate Arrays (FPGAs), and/or the like), memory 30, and a network interface 32. In addition, the radio access node 24 includes one or more radio units 34 that each includes one or more transmitters 36 and one or more receivers 38 coupled to one or more antennas 40. In some embodiments, the radio unit(s) 34 is external to the control system 26 and connected to the control system 26 via, e.g., a wired connection (e.g., an optical cable). However, in some other embodiments, the radio unit(s) 34 and potentially the antenna(s) 40 are integrated together with the control system 26. The one or more processors 28 operate to provide one or more functions of a radio access node 24 as described herein. In some embodiments, the function(s) are implemented in software that is stored, e.g., in the memory 30 and executed by the one or more processors 28.

Figure 4:
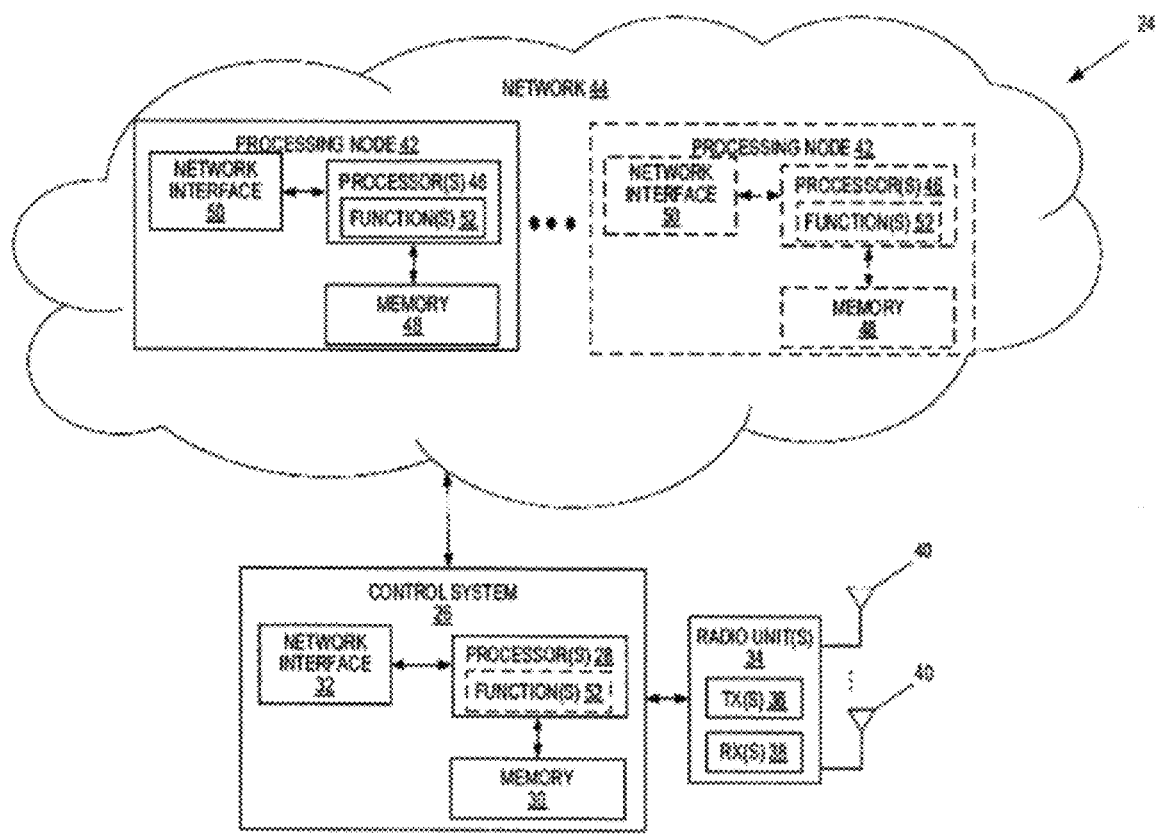
FIG. 4 is a diagram of an exemplary virtualized radio access node, according to various embodiments described herein.

FIG. 4 is a schematic block diagram that illustrates a virtualized embodiment of the radio access node 24 according to some embodiments of the present disclosure. This discussion is equally applicable to other types of network nodes. Further, other types of network nodes may have similar virtualized architectures.

As used herein, a "virtualized" radio access node is an implementation of the radio access node 24 in which at least a portion of the functionality of the radio access node 24 is implemented as a virtual component(s) (e.g., via a virtual machine(s) executing on a physical processing node(s) in a network(s)). As illustrated, in this example, the radio access node 24 includes the control system 26 that includes the one or more processors 28 (e.g., CPUs, ASICs, FPGAs, and/or the like), the memory 30, and the network interface 32 and the one or more radio units 34 that each includes the one or more transmitters 36 and the one or more receivers 38 coupled to the one or more antennas 40, as described above. The control system 26 is connected to the radio unit(s) 34 via, for example, an optical cable or the like. The control system 26 is connected to one or more processing nodes 42 coupled to or included as part of a network(s) 44 via the network interface 32. Each processing node 42 includes one or more processors 46 (e.g., CPUs, ASICs, FPGAs, and/or the like), memory 48, and a network interface 50.

In this example, functions 52 of the radio access node 24 described herein are implemented at the one or more processing nodes 42 or distributed across the control system 26 and the one or more processing nodes 42 in any desired manner. In some particular embodiments, some or all of the functions 52 of the radio access node 24 described herein are implemented as virtual components executed by one or more virtual machines implemented in a virtual environment(s) hosted by the processing node(s) 42. As will be appreciated by one of ordinary skill in the art, additional signaling or communication between the processing node(s) 42 and the control system 26 is used in order to carry out at least some of the desired functions 52. Notably, in some embodiments, the control system 26 may not be included, in which case the radio unit(s) 34 communicate directly with the processing node(s) 42 via an appropriate network interface(s).

In some embodiments, a computer program including instructions which, when executed by at least one processor, causes the at least one processor to carry out the functionality of radio access node 24 or a node (e.g., a processing node 42) implementing one or more of the functions 52 of the radio access node 24 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 3:
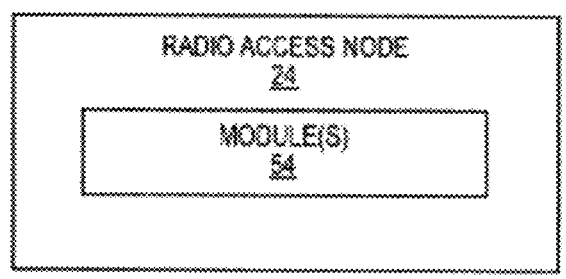
FIG. 3 is an exemplary block diagram of an embodiment of a radio access node, according to various embodiments.

FIG. 3 is a schematic block diagram of the radio access node 24 according to some other embodiments of the present disclosure. The radio access node 24 includes one or more modules 54, each of which is implemented in software. The module(s) 54 provide the functionality of the radio access node 24 described herein. This discussion is equally applicable to the processing node 42 of FIG. 6 where the modules 54 may be implemented at one of the processing nodes 42 or distributed across multiple processing nodes 42 and/or distributed across the processing node(s) 42 and the control system 26.

Figure 5:
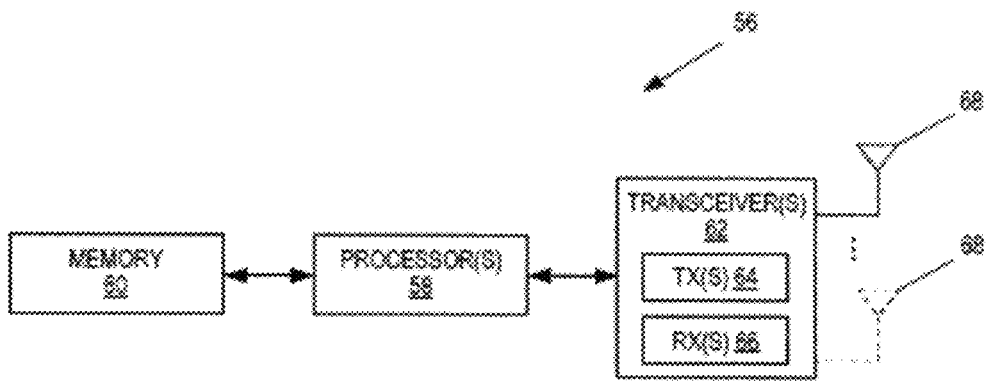
FIG. 5 is a block diagram of exemplary user equipment, according to various embodiments described herein.

FIG. 5 is a schematic block diagram of a UE 56 according to some embodiments of the present disclosure. As illustrated, the UE 56 includes one or more processors 58 (e.g., CPUs, ASICs, FPGAs, and/or the like), memory 60, and one or more transceivers 62 each including one or more transmitters 64 and one or more receivers 66 coupled to one or more antennas 68. In some embodiments, the functionality of the UE 56 described above may be fully or partially implemented in software that is, e.g., stored in the memory 60 and executed by the processor(s) 58.

In some embodiments, a computer program including instructions which, when executed by at least one processor, causes the at least one processor to carry out the functionality of the UE 56 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
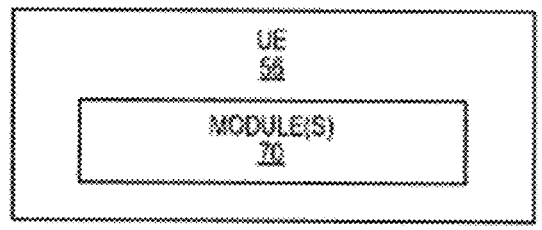
FIG. 6 is a block diagram of exemplary user equipment, according to various embodiments described herein.

FIG. 6 is a schematic block diagram of the UE 56 according to some other embodiments of the present disclosure. The UE 56 includes one or more modules 70, each of which is implemented in software. The module(s) 70 provide the functionality of the UE 56 described herein.

Any two or more embodiments described in this document may be combined in any way with each other. Furthermore, even though the examples herein are given in the LAA context, the embodiments described herein are not limited to LAA and can also apply in a more general case when the UE may need to configure measurement period adaptively to one or more conditions, e.g., channel quality, Ês/Iot, SINR, received signal quality, total interference or interference on a specific resources or from a specific interferer(s), etc. Other non-limiting examples where the method is particularly beneficial include measurement s for DRX or extended DRX, and measurement s in high speed train environments.

The embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The term "signaling" used herein may comprise any of: high-layer signaling (e.g., via RRC), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "conditions" used herein in general referrer to radio conditions. The radio conditions may be described e.g. by any one or more of: presence or absence (e.g., due to muting or LBT) of a certain signal or transmissions of a certain type or from a certain node, channel quality, Ês/Iot (e.g., as defined in 3GPP TS 36.133 where: Ês is the received energy per RE, power normalized to the subcarrier spacing, during the useful part of the symbol, i.e. excluding the cyclic prefix, at the UE antenna connector; Tot is the received power spectral density of the total noise and interference for a certain RE, power integrated over the RE and normalized to the subcarrier spacing, as measured at the UE antenna connector), signal to interference plus noise ratio (SINR), SIR (signal to interference ratio), SNR (signal to noise ratio), received signal quality, received signal strength, total interference or interference on specific time and/or frequency resources or from a specific interferer(s), RSRP, RSRQ, CSI-RSRP. An example of radio conditions corresponding to two different measurement periods: Es/Iot>=threshold1 and threshold1>Es/Iot>=threshold2.

The term "measurement period" used herein may refer to a time duration over which the UE is expected to filter measurement samples. In 3GPP specifications for both WCDMA and LTE, a measurement period is defined for UE physical layer measurements of serving and neighbor cells, for intra-frequency measurements, inter-frequency measurements, and CA measurements. The 3GPP standard also specifies the corresponding measurement accuracy requirements applicable for the specified measurement period. The measurement period is typically determined in time units (e.g., ms) or in number of time resources or blocks of time resources or measurement occasions (e.g., subframes, radio frames, discovery signal occasions, number of DRX cycles, etc.)

The term "measurement" herein refers to radio measurements. Some examples of the radio measurements are: signal strength or signal power measurements (e.g., RSRP or CSI-RSRP), signal quality measurements (e.g., RSRQ, SINR), timing measurements (e.g., Rx-Tx, RSTD, RTT, TOA), radio link monitoring measurements (RLM), CSI, PMI, cell detection, cell identification, etc. The measurements may be absolute or relative (e.g., absolute RSRP and relative RSRP). The measurements may be performed for one or more different purpose, e.g., RRM, SON, positioning, MDT, etc. The measurements may be, e.g., intra-frequency measurements, inter-frequency measurements, or CA measurements. The measurements may be performed in the licensed and/or unlicensed spectrum.

According to the present disclosure, a UE 56 is capable of performing the same measurement over at least two different measurement periods depending on one or more conditions.

Methods in a UE

Figure 7:
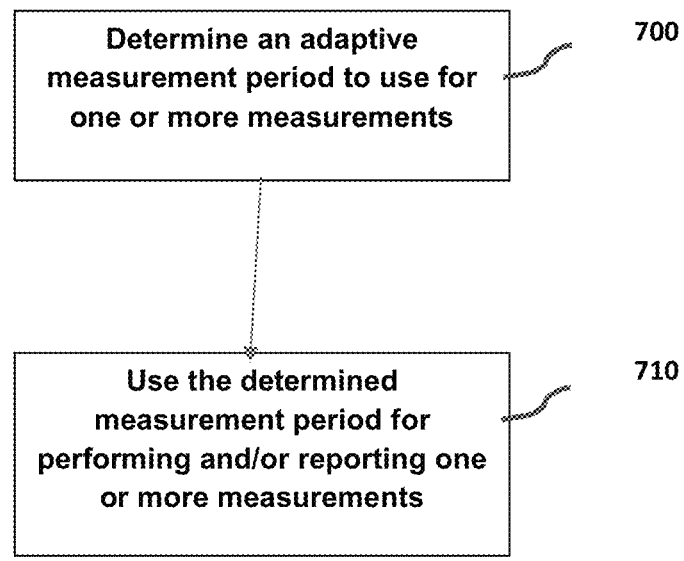
FIG. 7 is a flowchart depicting a method of determining a measurement period by a user equipment, according to an exemplary embodiment.

In one embodiment, as shown in FIG. 7, for example, the following steps can be implemented in a UE 56. It is noted that UE 56 can optionally perform concurrently at least two filterings (not shown), the filterings are associated with different measurement periods and each measurement period is associated with at least one condition.

At step 700, UE 56 determines an adaptive measurement period to use for one or more measurements. According to certain embodiments, UE 56 selects one from a set of pre-determined measurement periods, wherein each of the measurement periods is associated with at least one condition, the selection can be performed adaptively to the conditions and can be based on an assessment of one or more of the conditions. The assessment can be performed in the UE 56 or in another node, e.g., a radio access node, such as an eNB.

If the assessment is in another node, UE 56 can select the measurement period based on the received indication from an assessing node, e.g., a radio access node. The UE may also provide information or measurements for such assessment to be performed in the assessing node.

If the assessment is performed in the UE 56, the UE may use various information or measurements to determine which measurement period to select. The assessment in the UE may comprise, e.g., any one or more of: dynamic evaluation of one or more conditions, determining (e.g., upon a trigger condition or periodicity) whether one or more conditions have changed by an amount greater than a threshold, keeping track of one or more of conditions. Based on the assessment, the UE 56 can then select the measurement period. Such conditions may, for example be based on standardized UE 56 measurements or UE 56 internal estimates of radio conditions such as one or more of location, RSRP, RSRQ, RS-SINR, or other SINR estimates.

When the assessment is performed in a different node, it can be based e.g. on any one or more of: the UE measurements available in the assessing node, UE location, history information, conditions prediction by the second mode (e.g., interpolation or extrapolation), statistics. The assessing node can then select the measurement period, based on the assessment, and indicate to the UE the selected measurement period (see also Section 5.2.2). In one example, a network node may indicate to the UE whether a single-shot or a multi-shot measurement is to be performed. The UE thus selects the measurement period based on the received indication from the network node. The UE may also provide information or measurements for the assessment described above to be performed in the assessing node.

Optionally, the UE 56 may also determine that the necessary signals are not present at some predetermined times and can extend the measurement period accordingly. According to certain embodiments, filtering may also be adapted to avoid filtering when the signals are not present, for example. For example, filtering of LAA measurements may be avoided during LBT which makes the necessary signals unavailable.

At step 710, UE 56 configures and uses the selected measurement period for performing and/or reporting (e.g., to another node or to a higher layer) one or more measurements.

In one embodiment, when the UE has been performing concurrent sampling and filtering, the UE can create a measurement report based on the sampling and filtering corresponding to the selected measurement period. The measurement report is then reported to a higher layer or to another node (e.g., a network node or a second UE).

In another embodiment, the UE can configure sampling and filtering, based on the selected measurement period, and perform the measurement accordingly. The measurement can then be reported to a higher layer or another node (e.g., a network node or a second UE).

Figure 8:
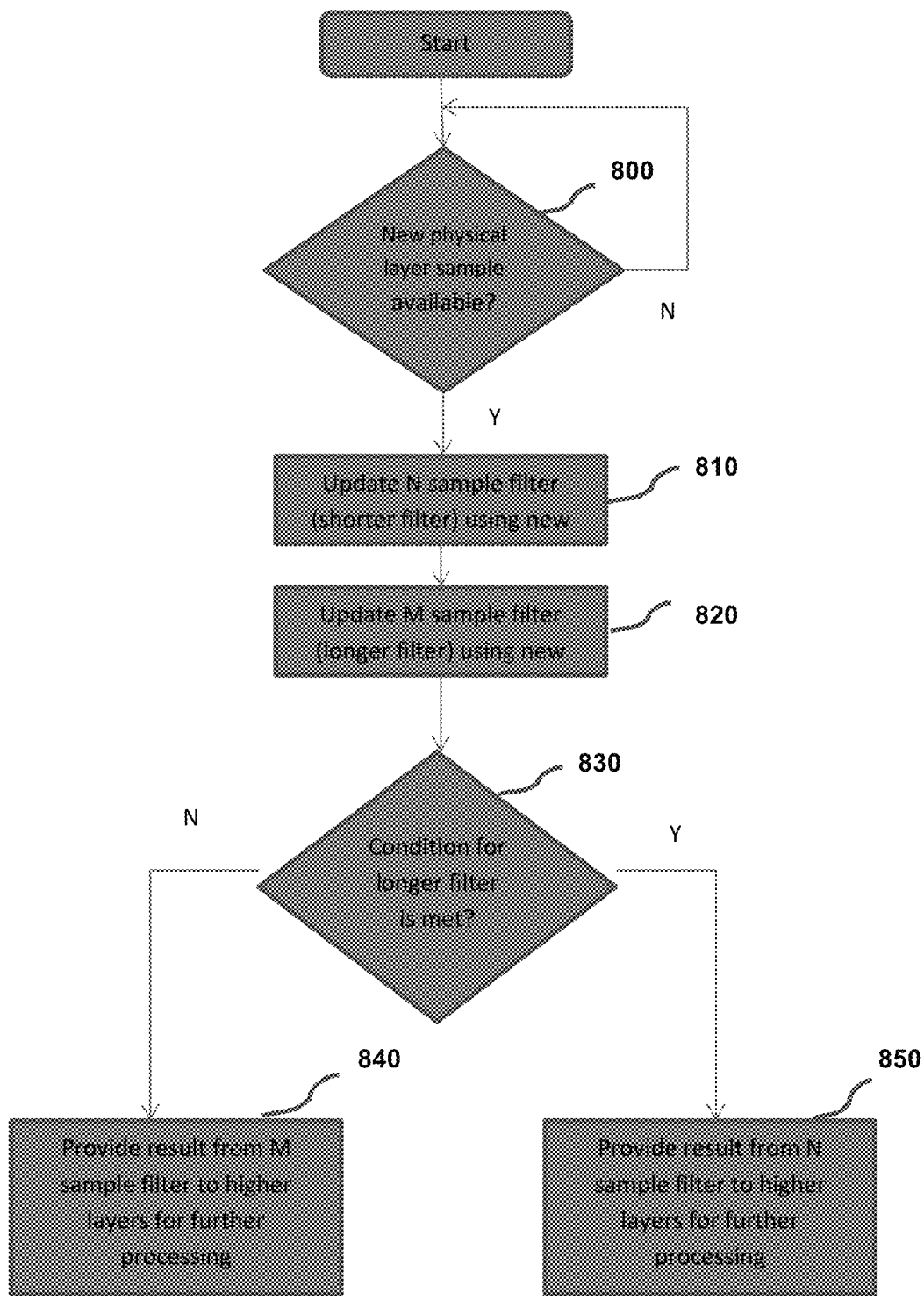
FIG. 8 is a flowchart depicting a method of determining a measurement period using multiple filterings, according to an exemplary embodiment.

FIG. 8 is an exemplary flow chart illustrating one embodiment of the present disclosure. As shown in FIG. 8, at step 800 the UE determines whether a new physical layer sample is available. If a new sample is available, the process proceeds to steps 810, 820, where UE 56 updates at least two different filtered measurement estimates of each measured cell corresponding to at least two different measurement periods. The filtered measurement estimates may correspond to RSRP, RSRQ, CSI-RSRP or any other cellular measurement (see above) performed by the physical layer, for example. Alternatively, the filtering scheme may correspond to a running average filter.

As an exemplary embodiment, an M sample running average, and an N sample running average at time index t may be updates as follows. M>N, and M(t) is the $t^{th}$ physical layer sample of the measurement to be filtered. SN(t) is the sum of the last N samples, SM(t) is the sum of the last M samples, and FN(t) and FM(t) are the running averages over N and M samples respectively: It can be seen that:

$$S_N(t) = \sum_{i=0}^{N-1} M(t-i) \quad \text{Eq. (2)}$$

$$S_M(t) = S_N(t) + \sum_{i=N}^{M-1} M(t-i) \quad \text{Eq. (3)}$$

$$F_N(t) = \frac{1}{N} S_N(t) \quad \text{Eq. (4)}$$

$$F_M(t) = \frac{1}{M} S_M(t) \quad \text{Eq. (5)}$$

At step 830, the UE 56 can additionally estimate at least one metric for each measured cell giving an indication of the measurement period needed to ensure a sufficiently accurate measurement. The metric in may correspond to RS-SINR, RSRQ or any other metric which gives an indication of the measurement period needed to ensure a sufficiently accurate measurement.

the UE 56 can select one out of the at least two different measurement estimates depending on which measurement period is needed to ensure a sufficiently accurate measurement. In the example of FIG. 8, a decision is made regarding whether a condition for a longer filter is met, at step 830.

At steps 840, 850, the selected filtered measurement estimate can be provided to and used by the higher layers of the UE implementation which may perform L3 filtering, event evaluation, periodic reporting, reselection evaluation or any other higher layer procedures using measurement results. In the exemplary embodiment depicted in FIG. 8, if a condition for a longer filter is met, the process proceeds to step 850, where the results from an N sample filter is provided to a higher layer for further processing. Otherwise, the process proceeds to step 840, where the results from an M sample filter is provided to a higher layer for further processing.

Methods in a Node Other Than the UE

Figure 9:
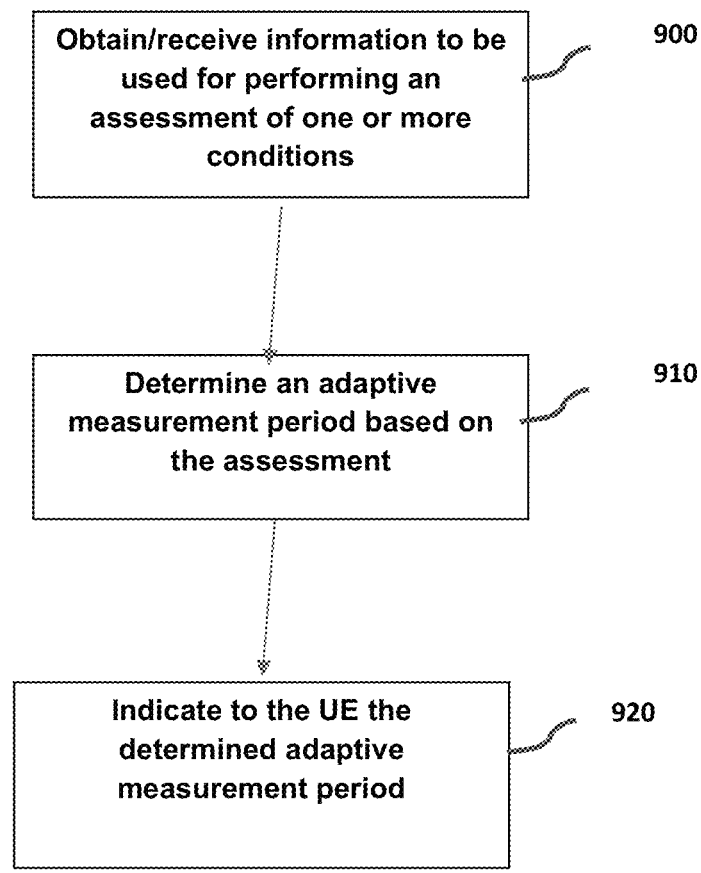
FIG. 9 is a flowchart depicting a method of determining a measurement period performable by various network nodes, according to an exemplary embodiment.

The methods in another node (e.g., another UE or any other network node) herein reflect the UE embodiments described above. FIG. 9 depicts a flowchart of the process, as performed by a network node other than the UE 56. As shown in FIG. 9, at step 900, the other node can obtain the information necessary for assessment in the assessing node conditions at the UE 56 associated with different measurement periods for at least one measurement to be performed by the UE 56.

In one example, the information may comprise any one or more of: UE measurements available in the assessing node or which can be obtained (e.g., requested from the UE), UE location, history information, predicted conditions (e.g., by interpolation or extrapolation), statistics, etc.

Thereafter, at step 910, an appropriate processor at or accessible by the other node may be implemented to select or otherwise determine the measurement period, based on the assessment. Thereafter, a transmitter at the other node (or controllable by the other node) can indicate to the UE 56 the selected measurement period, at step 920.

In one further example, a network node may indicate to the UE 56 whether a single-shot or a multi-shot measurement is to be performed.

It is noted that regardless of in which node the adaptive measurement period is determined, the determining may comprise the following functionality at least in part, in various combinations and orders:

Selecting a measurement period from a set of pre-configured or pre-determined measurement periods or measurement configurations, based on the assessment result and the determined condition, Selecting measurement period from a set of standardized measurement periods, based on the assessment result and the determined condition, Mapping the assessment result to the measurement period, e.g., based on a table, Deriving the measurement period by a function, Determining the presence or absence (e.g., due to muting or LBT) of a certain signal or transmissions of a certain type or from a certain node, e.g., when LBT is determined the measurement period may be further extended to account for unavailability of necessary signals at certain times, Applying a pre-defined rule, e.g.:
  A first measurement period is selected if a first condition is met, and a second measurement period is selected if a second condition is met,
  When a first measurement period is comprised in a second measurement period (e.g., during concurrent filtering), the first measurement period is selected when the first condition is met during the first measurement period, otherwise the second measurement period is selected. In one example, the first measurement period is one discovery signal occasion comprised in the second measurement period comprising two or more discovery signal occasions, and the first measurement period is associated with the condition Es/Iot>=0 dB, while the second measurement period is associated with the condition 0 dB>Es/Iot>=−6 dB; the first measurement period is selected whenever the first condition is met during any of the discovery signal occasions within the second measurement period. In another example, whenever the first condition is met over the first measurement period (which is comprised in the second measurement period), the UE reports the measurement without waiting until the end of the second measurement period, and the UE may use all or any samples from the beginning of the second measurement period until the end of the first measurement period.

This may be extended to selection of more than two measurement periods, based on more than two criteria.

Selecting a filtering result from two or more available filterings which may be conducted concurrently.

According to various embodiments, not all the UEs may be capable of adaptive measurement period configuration, i.e., the UE being capable of performing the same measurement over at least two different measurement periods depending on the conditions.

In one embodiment, a first UE, which is capable of adaptively configuring measurement period, signals its capability to another node (e.g., a network node or another UE). The signaling may be implicit or explicit, and it may be upon a request or in an unsolicited way.

In another embodiment, another node (e.g., a network node or a second UE, which may or may not be an assessing node) determines the first UE's capability to adaptively configure measurement period and uses it for one or more operational tasks. In this example, the determination may be performed by the other node autonomously (e.g., based on one or more of: pre-defined rule, measurements, measurement report time, etc.) or based on the indication received from the first UE.

Some examples of the operational tasks can include configuring UE measurement (e.g., configuring UE LAA measurements accounting for the UE capability, configuring UE measurement bandwidth, configuring time and/or frequency resources for measurements, configuring measurement periodicity, configuring a certain measurement window, configuring measurement period); in one example, a UE without the capability may be configured with a single-shot measurement, otherwise with a multi-shot measurement;

Yet another example of an operational task can include configuring signal transmissions to be received by the UE with such capability (e.g., configuring one or more of: transmit power, time and/or frequency resources for the transmissions, the number of signal repetitions, signal periodicity, specific signal type) to meet the conditions for a certain target measurement period to facilitate the UE adaptation.

Yet another example of an operational task can include configuring signal transmissions to be received by the UE without such capability (e.g., configuring one or more of: transmit power, time and/or frequency resources for the transmissions, the number of signal repetitions, signal periodicity, specific signal type) to meet the conditions for the measurement period supported by the UE without the capability.

A further example of an operational task includes scheduling adaptation (e.g., to create certain conditions such as reduced interference for UEs with or without the capability to facilitate their measurements; to optimize resource utilization in the transmitting node to account for that UEs capable of faster reporting require fewer transmissions from the transmitting node).

Another operational tasks can be to inform one or more other nodes about the presence of UEs with or without such capability, UE activity configuration (e.g., a longer DRX may be configured for UEs capable of reporting faster in some conditions), and/or power saving in the transmitting node (e.g., considering that UEs capable of faster reporting require fewer transmissions from the transmitting node).

Figure 10:
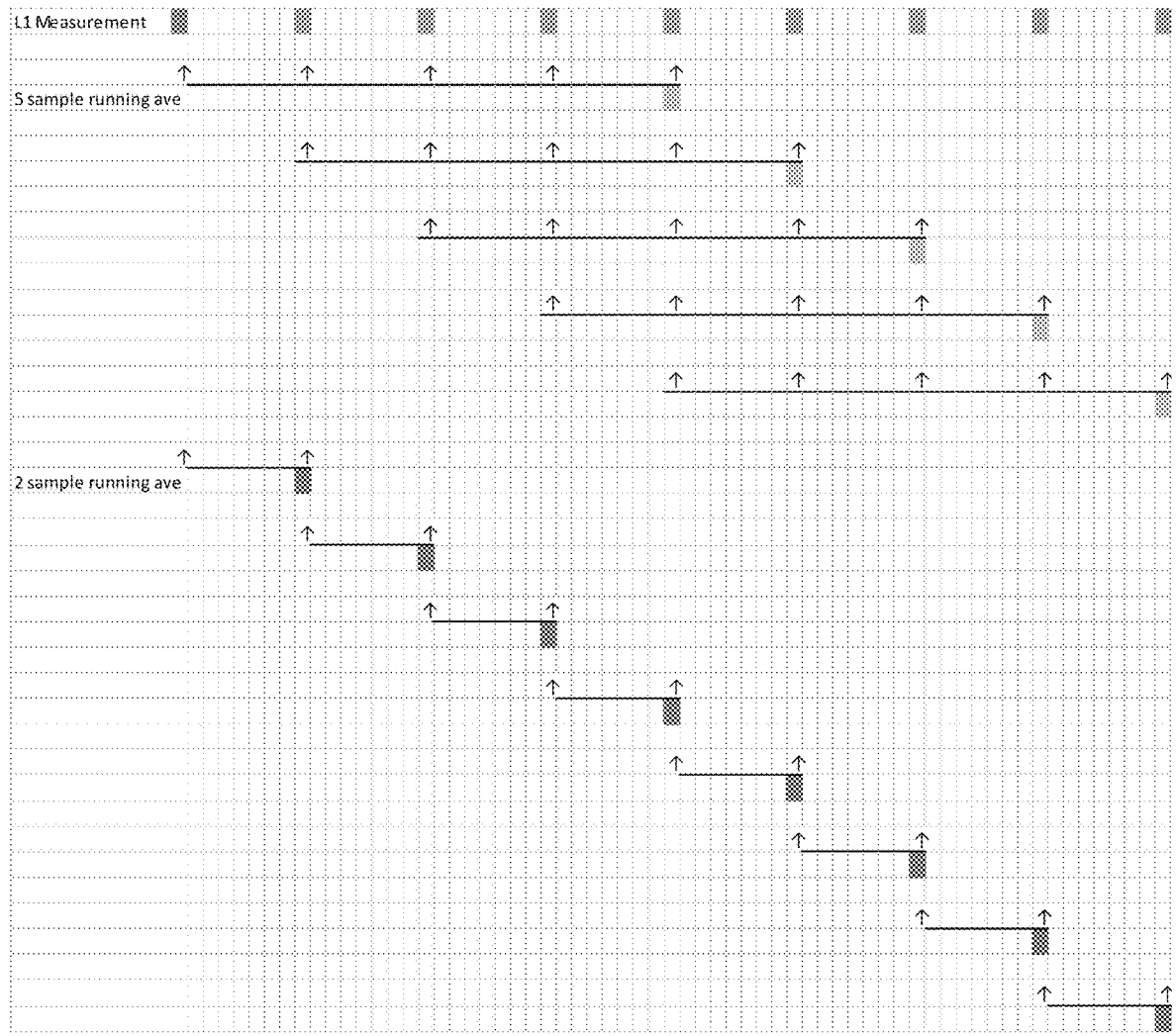
FIG. 10 shows an example parallel calculation of two running averages in time, according to an exemplary embodiment.

FIG. 10 shows an example parallel calculation of two running averages in time. The UE physical layer is assumed to make measurements of a cell periodically, for example every 40 ms as indicated by the blue trace. A running average over 5 samples (top half) and over 2 samples (bottom half) is calculated based on the current and previous 4 samples (5 sample running average) and current and previous 2 samples (2 sample running average, respectively.

Figure 11:
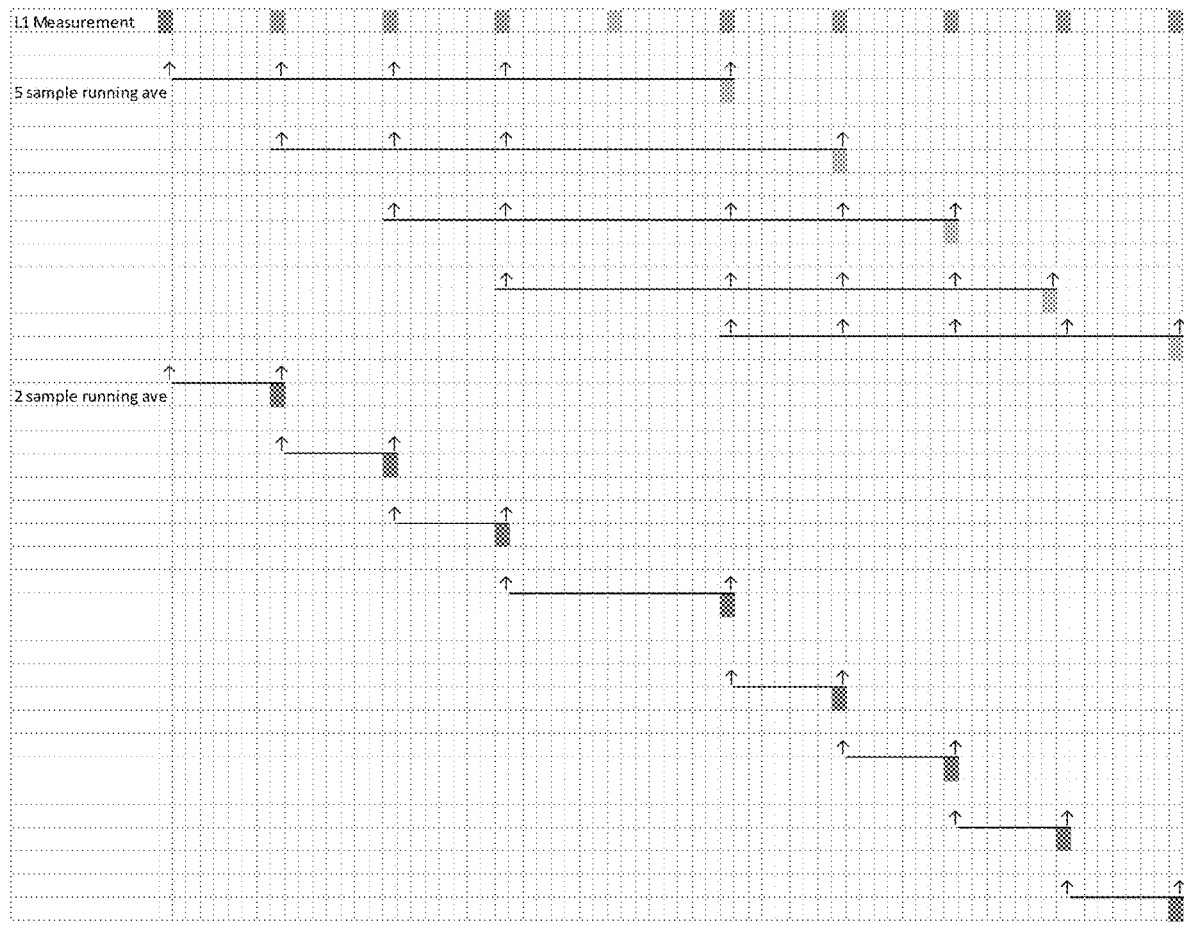
FIG. 11 shows an example calculation of 5-sample and 2-sample running averages, according to an exemplary embodiment.

As shown in FIG. 11, in case some DRS transmission is not performed by the eNB e.g. due to LBT (represented by the fifth sample from the left) the UE physical layer is expected to detect missing transmissions and in this case it will not perform measurements, i.e. some of the other physical layer samples would be missed. In these cases, the 5-sample and 2-sample running averages are as shown in the figure.

Figure 12:
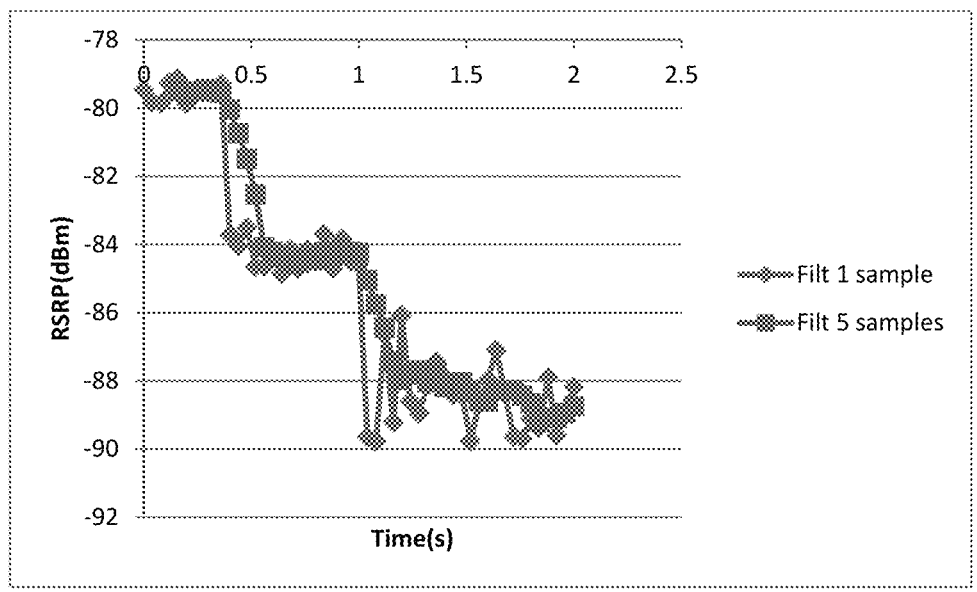
FIG. 12 represents a simulation of measured reference signal received power (RSRP), according to an exemplary embodiment.

FIG. 12 represents a simulation of measured RSRP. In this simulation, AWGN noise was simulated and the actual RSRP starts at −80 dBm, and it is switched to −85 dBm at t=0.4 s and −90 dBm at t=1.04 s. The AWGN is also modified such that Es/Iot=3 dB in the first phase of the simulation, Es/Iot=1 dB in the second phase of the simulation and Es/Iot=−4 dB in the final phase.

The diamond-shaped trace represents measurement samples filtered using a 1 sample running average (i.e. unfiltered for this case) and the square-shaped trace represents measurement samples using a 5 sample running average. The following aspects may be noted:
1) The diamond-shaped trace shows more rapid response (in this case instantaneous) to step changes in nominal RSRP due to the usage of a shorter filter;
2) The diamond-shaped trace shows more variance especially when the SINR becomes poor as multiple samples are not averaged; and
3) Both traces show a positive bias especially at low SINR (where the nominal RSRP is −90 dBm). This is a well-known property of RSRP as in high noise conditions some part of the noise power is incorrectly classified as CRS reference symbol power. The suppression of noise power in CRS power estimation will depend on the coherent averaging of reference symbols which is performed (depending on UE implementation). Additional incoherent averaging of power estimates does not reduce the bias since averaging a fixed bias does not remove it. However, the accuracy of the square-shaped trace may be significantly better than the diamond-shaped trace due to the reduction of variance caused by the averaging (as per observation 2).

Figure 13:
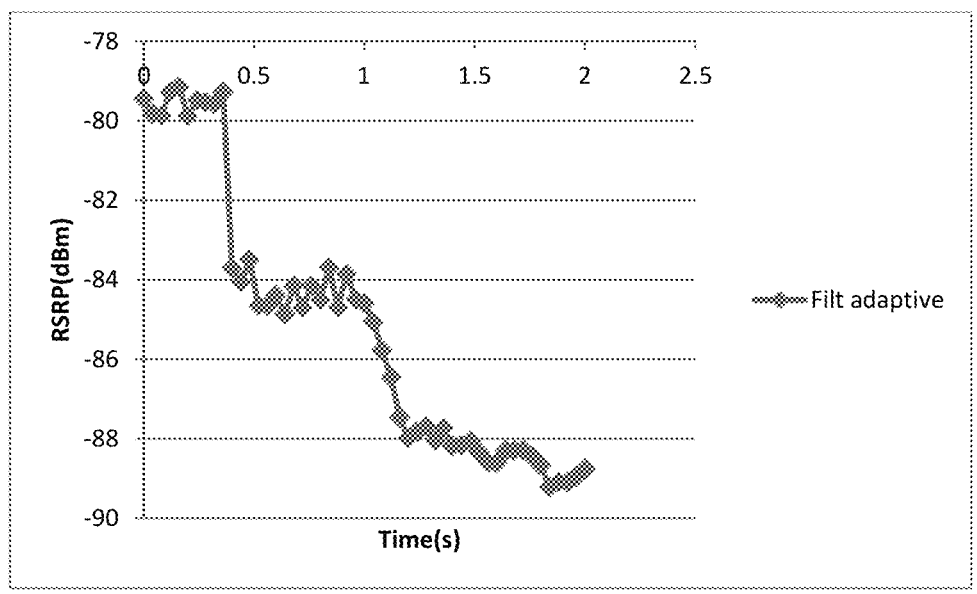
FIG. 13 shows an exemplary adaptive measurement result, where a 1-sample filter is used above 0 dB SINR, and a 5-sample filter is used below 0 dB SINR, according to an embodiment.

FIG. 13 shows the adaptive measurement result, where the 1-sample filter is used above 0 dB SINR, and the 5-sample filter is used below 0 dB SINR. SINR estimation was not explicitly simulated, but this may be performed by implementations of the method. This trace represents the overall measurement result that would be reported according to the method.

As can be seen, the adaptive method provides for a more rapid filter response to the step change at t=0.4 s (as SINR is above 0 dB, the single sample RSRP estimate is used) while reducing the variance in the low SINR regime after t=1.04 s. The response to the step change in RSRP is slower in this regime, because the result of the 5 sample running average filter is used, so the output only converges fully after 5 samples have been put into the filter history.

Based on the foregoing embodiments, the UE measurement period for a measurement is dynamically configured, adaptively to one or more conditions. The condition(s) are assessed dynamically by the UE or another node. In one example, assessing a condition may comprise evaluating various metrics, e.g., SINR.

In one embodiment, adapting the measurement period may comprise maintaining concurrently two or more measurement filters with different measurement periods and then selecting the appropriate one, based on the condition assessment result.

The measurement result based on the determined measurement period may then be reported to higher layers and/or another node.

According to advantages to the foregoing embodiments, measurements are reported more quickly in good radio conditions (e.g., high Es/Iot). Further, measurement reporting accuracy is not compromised in less good radio conditions (e.g., lower Es/Iot). The UE can track the conditions to facilitate dynamic configuration of the appropriate measurement period. Meanwhile, the network is aware of the UE's capability of dynamically configuring the measurement period.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

Abbreviations

| Abbreviation | Explanation |
| --- | --- |
| CA | Carrier Aggregation |
| CSI-RSRP | Channel State Information-Reference symbol received power |
| DRS | Discovery Signal |
| DRX | Discontinuous Reception |
| eNB | Evolved node B |
| LAA | License assisted access |
| LBT | Listen before talk |
| LTE | Long-Term Evolution |
| RSRP | Reference symbol received power |
| RSRQ | Reference symbol received quality |

What is claimed is:

1. A method performed by a user equipment (UE), comprising:

selecting an adaptive measurement period to use for one or more measurements, based at least in part on an assessment of one or more conditions, wherein the selected adaptive measurement period is associated with at least one condition, wherein the selecting the adaptive measurement period further comprises determining that the necessary signals are not present at a predetermined time and extending the measurement period accordingly;

maintaining concurrently a first sampling and filtering and a second filtering, where the first sampling and filtering correspond to a selected measurement period and second filtering corresponds to measurement period that is different than the selected measurement period; and using the selected measurement period for performing one or more measurements;

performing sampling and filtering based on the first sampling and filtering concurrently with performing filtering based on the second filtering and creating a measurement report based on the first sampling and filtering, and reporting the measurement report to a higher layer, a network node or a second UE.

2. The method of claim 1, wherein the one or more conditions comprise at least one of a radio condition such as comparison of Es (received energy per RE)/Iot (received power spectral density of the total noise and interference for a certain RE), signal-interference-to-noise ratio (SINR), reference signal received power (RSRP), channel state information (CSI)-RSRP, or reference signal received quality (RSRQ) with a threshold.

3. The method of claim 1, wherein the determining an adaptive measurement period further comprises using a first measurement period for performing a single shot measurement when a first condition is met and using a second measurement period for performing a multi-shot measurement when a second condition is met.

4. The method of claim 1, wherein the selecting an adaptive measurement period further comprising using a first filtering configuration to obtain a first measurement estimate and using a second filtering configuration to obtain a second measurement estimate corresponding to the first and the second measurement periods respectively.

5. The method of claim 4 further comprising reporting one of the first and the second measurement estimates.

6. The method of claim 4 further comprising reporting both of the first and the second measurement estimates.

7. The method of claim 1, wherein the selecting comprising mapping the assessment to the adaptive measurement period using a predetermined table.

8. The method of claim 5, wherein filtered measurement estimates correspond to at least one of RSRP, RSRQ or CSI-RSRP.

9. The method of claim 4, wherein at least one filtering scheme corresponds to a running average filter.

10. The method of claim 1, wherein the assessment includes determining whether one or more conditions have changed by an amount greater than a predetermined threshold.

11. The method of claim 1, wherein the selecting is performed at a predetermined periodicity.

12. The method of claim 1, wherein the selecting is performed upon a trigger condition.

13. The method of claim 1, wherein the adaptive measurement period is selected from a set of pre-defined or standardized measurement periods.

14. The method of claim 1 further comprising indicating to a network node the UE's capability to adaptively configuring measurement period.

15. A user equipment (UE), comprising:
processor communicatively coupled to a memory configured to:
select an adaptive measurement period to use for one or more measurements, based at least in part on an assessment of one or more conditions,
wherein the processor is further configured to determine that the necessary signals are not present at a predetermined time and extending the measurement period accordingly,
wherein the selected adaptive measurement period is associated with at least one condition, wherein the processor is further configured to maintain concurrently a first sampling and filtering and a second filtering, where the first sampling and filtering correspond to a selected measurement period and second filtering corresponds to measurement period that is different than the selected measurement period; and
use the selected measurement period for performing one or more measurements;
performing sampling and filtering based on the first sampling and filtering concurrently with performing filtering based on the second filtering and creating a measurement report based on the first sampling and filtering, and
reporting the measurement report to a higher layer, a network node or a second UE.

16. The UE of claim 15, wherein the one or more conditions comprise at least one of a radio condition such as comparison of Es (received energy per RE)/Iot (received power spectral density of the total noise and interference for a certain RE), signal-interference-to-noise ratio (SINR), reference signal received power (RSRP), channel state information (CSI)-RSRP, or reference signal received quality (RSRQ) with a threshold.

17. The UE of claim 15, wherein the processor is further configured to use a first measurement period for performing a single-shot measurement if a first condition is met and use a second measurement period for performing a multi-shot measurement if a second condition is met.

18. The UE of claim 15, wherein the processor is further configured to use a first filtering configuration to obtain a first measurement estimate and use a second filtering configuration to obtain a second measurement estimate corresponding to the first and the second measurement periods respectively.

19. The UE of claim 18 further comprising a transceiver configured to report one of the first and the second measurement estimates.

20. The UE of claim 18 further comprising a transceiver configured to report both of the first and the second measurement estimates.

21. The UE of claim 15, wherein the processor is further configured to map the assessment to the adaptive measurement period using a predetermined table.

22. The UE of claim 19, wherein filtered measurement estimates correspond to at least one of RSRP, RSRQ or CSI-RSRP.

23. The UE of claim 18, wherein at least one filtering scheme corresponds to a running average filter.

24. The UE of claim 15, wherein the assessment includes determining whether one or more conditions have changed by an amount greater than a predetermined threshold.

25. The UE of claim 15, wherein the processor performs the determining at a predetermined periodicity.

26. The UE of claim 15, wherein the processor performs the determining upon a trigger condition.

27. The UE of claim 15, wherein the adaptive measurement period is selected from a set of pre-defined or standardized measurement periods.

28. The UE of claim 15 further comprising a transceiver configured to indicate to a network node the UE's capability to adaptively configuring measurement period.

* * * * *